Sept. 6, 1927. Re. 16,733
S. W. JENKS
ELECTROLYTIC REFLECTOR
Original Filed Sept. 11, 1922
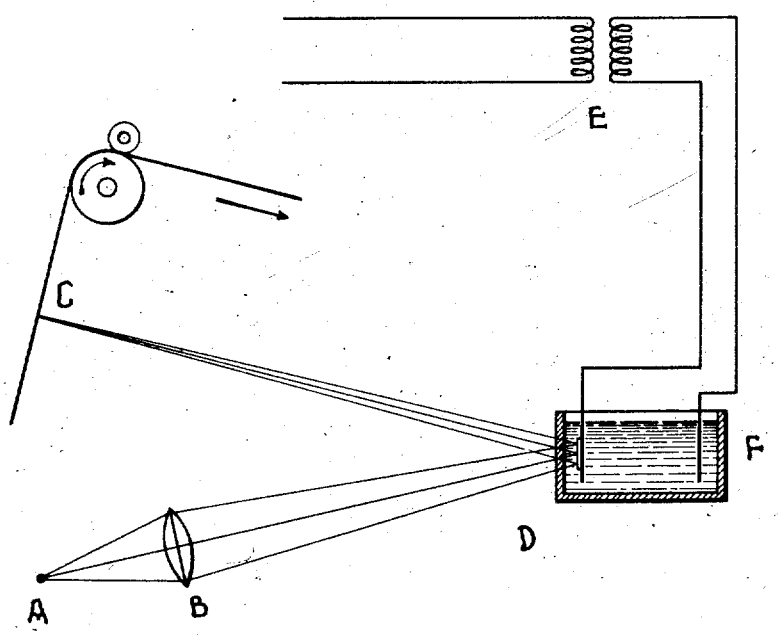
INVENTOR:
STUART W. JENKS.
By Paul Carpenter
ATTORNEY.

Issued Sept. 6, 1927. Re. 16,733

UNITED STATES PATENT OFFICE.

STUART W. JENKS, OF WASHINGTON, DISTRICT OF COLUMBIA.

ELECTROLYTIC REFLECTOR.

Original No. 1,525,554, dated February 10, 1925, Serial No. 587,408, filed September 11, 1922. Application for reissue filed January 10, 1927. Serial No. 160,320.

This invention relates to apparatus for the transmission of pictures-by-radio, and has for its principal object means for changing the intensity value of the light from a light source of constant intensity, in order to produce lights and shades and half-tones on the photographic surface upon which it impinges in the apparatus at the receiving station.

In the diagrammatic drawing herewith, A is a source of light of constant intensity, B a lens for gathering the diverging light rays therefrom and concentrating them on the film C, after having been reflected from the metal-faced mirror D. The mirror D is located in an electrolytic bath and is connected to a source of oscillating current illustrated as coming from the transformer E. The electrolytic solution is contained in the glass jar F.

The operation of the device is as follows: With the light of uniform value reflected from the surface of the mirror D, a uniform strength of light is obtained on the picture surface C. But when current begins to flow in the oscillating circuit, a deposit is formed on the face of the mirror in minute specks, which tend to reduce the area of light reflecting surface, and, therefore, the amount of light falling on the film C. When the current reverses, the mirror becomes the opposite pole of the oscillating circuit, and these particles are removed and the normal strength of the light again falls on the film C. When a less strength of current passes, obviously there is a less deposit, and, therefore, a less interruption to the reflection of the light from the mirror.

It will be found, therefore, that the amount of light reflected from the mirror is governed by the strength of the electrolytic deposit, and as the electrolytic deposit results from the fluctuating current values in the transformer E, the amount of light which falls on the light-sensitive film C fluctuates in accord with the impressed current values, and as the film C is in motion, the result of the developable value of the exposure on the film C varies accordingly.

It is obvious that with the specific arrangement shown only a single line varying in density will be recorded on the film, but it is to be understood that the film and rotating drum are intended to represent any suitable arrangement for producing relative movement between the projected light and the light receiving surface, and it will be apparent to one skilled in the art that any one of several well known forms of apparatus may be used to distribute the light variations over the surface in proper order to reproduce the original picture or record.

This electrolytic deposit may be alternately added to and taken from a transparent anode-cathode, but as this is made the subject of a separate application, a description thereof is not herein included.

What I claim is:

1. In devices of the character described, a source of light of fixed intensity, a light sensitive surface so located as to receive light from said source, and means lying between whereby an electrolytic deposit thereon reduces the amount of light passing from said source to said film.

2. In devices of the character described, a source of light of fixed intensity, a light sensitive surface so located as to receive light from said source, and means lying between whereby an electrolytic deposit alternately added to and subtracted therefrom varies the value of light passing from said source to said film.

3. In devices of the character described, a source of light of fixed intensity, a light receiving surface so located as to receive light from said source, and means lying between whereby an electrolytical deposit is alternately added to and subtracted therefrom to vary the amount of light passing from said source to said film.

In testimony whereof I affix my signature.

STUART W. JENKS.